US012695951B2

(12) United States Patent
Dasher et al.

(10) Patent No.: US 12,695,951 B2
(45) Date of Patent: Jul. 28, 2026

(54) SYSTEMS AND METHODS FOR OPTIMIZING REENGAGEMENT WITH A CONTENT ITEM BY LEVERAGING ADVANCED MEMORY-RELATED TECHNIQUES

(71) Applicant: Adeia Guides Inc., San Jose, CA (US)

(72) Inventors: Charles Dasher, Lawrenceville, GA (US); Serhad Doken, Bryn Mawr, PA (US); Mareeta Mathai, San Jose, CA (US); Aldis Sipolins, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 40 days.

(21) Appl. No.: 18/981,069

(22) Filed: Dec. 13, 2024

(65) Prior Publication Data

US 2026/0172637 A1      Jun. 18, 2026

(51) Int. Cl.
  *H04N 21/218*          (2011.01)
  *H04N 21/258*          (2011.01)
        (Continued)
(52) U.S. Cl.
  CPC ... *H04N 21/47217* (2013.01); *H04N 21/4312* (2013.01); *H04N 21/44222* (2013.01); *H04N 21/4662* (2013.01)
(58) Field of Classification Search
  None
  See application file for complete search history.

(56) References Cited

U.S. PATENT DOCUMENTS 7,248,778 B1    7/2007  Anderson et al.
8,447,169 B2    5/2013  Lewis
              (Continued)

FOREIGN PATENT DOCUMENTS

EP        2991076 A1    3/2016
EP        3073743 A1    9/2016
              (Continued)

OTHER PUBLICATIONS

Bubble Sort Algorithm, available online at: <https://www.geeksforgeeks.org/bubble-sort-algorithm/>, Oct. 6, 2024, 4 pages.
              (Continued)

*Primary Examiner* — Brian T Pendleton
*Assistant Examiner* — Jean D Saint Cyr
(74) *Attorney, Agent, or Firm* — HG LAW LLP

(57)            ABSTRACT
Systems and methods are provided for optimizing reengagement with a content item by leveraging advanced memory-related techniques. At a first time, a user is determined to be disengaged from consuming a content item at a first position within the content item. A reengagement cue is determined by selecting a plurality of portions of the content item, wherein the plurality of portions of the content item are positioned in the content item prior to the first position within the content item. A respective memorability score is determined for each of the plurality of portions. A subset of the plurality of portions is identified based on the respective memorability scores. The reengagement cue is generated based at least part of each of the portions in the subset. At a second time, based at least in part on receiving a request to reengage with the content item, the reengagement cue is presented.

20 Claims, 9 Drawing Sheets

(51) Int. Cl.

| | |
|---|---|
| *H04N 21/431* | (2011.01) |
| *H04N 21/439* | (2011.01) |
| *H04N 21/442* | (2011.01) |
| *H04N 21/45* | (2011.01) |
| *H04N 21/466* | (2011.01) |
| *H04N 21/472* | (2011.01) |

(56) References Cited

U.S. PATENT DOCUMENTS

| | | | |
|---|---|---|---|
| 8,875,185 | B2 | 10/2014 | Marcus |
| 9,641,898 | B2 | 5/2017 | Bloch et al. |
| 9,767,850 | B1 | 9/2017 | Brough |
| 9,866,887 | B2 | 1/2018 | Guo et al. |
| 9,946,429 | B2 | 4/2018 | Viegers et al. |
| 9,967,621 | B2 | 5/2018 | Armstrong et al. |
| 10,250,932 | B2 | 4/2019 | Osminer |
| 10,311,913 | B1 | 6/2019 | Shekhar et al. |
| 10,319,410 | B1 | 6/2019 | Townsend et al. |
| 10,419,830 | B2 | 9/2019 | Packard et al. |
| 10,791,352 | B2 | 9/2020 | Ranjeet et al. |
| 10,911,815 | B1 | 2/2021 | McCarthy et al. |
| 10,970,895 | B1 * | 4/2021 | Knas .................... G06V 40/176 |
| 11,004,471 | B1 | 5/2021 | Kim et al. |
| 11,170,819 | B2 | 11/2021 | Brinkman, Jr. et al. |
| 11,582,536 | B2 | 2/2023 | Packard et al. |
| 11,734,930 | B1 | 8/2023 | Chen et al. |
| 11,917,251 | B2 | 2/2024 | Dhanwal et al. |
| 12,062,386 | B2 | 8/2024 | Robert Jose et al. |
| 2003/0163815 | A1 | 8/2003 | Begeja et al. |
| 2005/0217462 | A1 | 10/2005 | Thomson et al. |
| 2005/0254782 | A1 | 11/2005 | Hsu |
| 2007/0006255 | A1 | 1/2007 | Cain |
| 2007/0239785 | A1 | 10/2007 | Duncombe et al. |
| 2007/0297755 | A1 | 12/2007 | Holt et al. |
| 2009/0238538 | A1 | 9/2009 | Fink |
| 2011/0142420 | A1 | 6/2011 | Singer |
| 2012/0201518 | A1 | 8/2012 | Singer |
| 2012/0263439 | A1 | 10/2012 | Lassman et al. |
| 2013/0047175 | A1 * | 2/2013 | Ramirez Flores . H04N 21/4223 |
| | | | 725/12 |

| | | | |
|---|---|---|---|
| 2013/0160051 | A1 | 6/2013 | Armstrong et al. |
| 2014/0089999 | A1 | 3/2014 | Moradian |
| 2014/0101551 | A1 | 4/2014 | Sherrets et al. |
| 2014/0108932 | A1 | 4/2014 | Soderstrom |
| 2014/0325568 | A1 | 10/2014 | Hoang et al. |
| 2015/0185965 | A1 | 7/2015 | Belliveau et al. |
| 2015/0243325 | A1 | 8/2015 | Pacurariu et al. |
| 2015/0293928 | A1 | 10/2015 | Chen et al. |
| 2016/0014482 | A1 | 1/2016 | Chen et al. |
| 2016/0035392 | A1 | 2/2016 | Taylor et al. |
| 2016/0316280 | A1 | 10/2016 | Bulley et al. |
| 2016/0358629 | A1 | 12/2016 | Pribula |
| 2017/0220869 | A1 | 8/2017 | Blong et al. |
| 2017/0332140 | A1 * | 11/2017 | Blake ............... H04N 21/44218 |
| 2018/0061455 | A1 | 3/2018 | Singer |
| 2018/0342266 | A1 | 11/2018 | Snell et al. |
| 2020/0143198 | A1 | 5/2020 | Kansara |
| 2020/0145737 | A1 | 5/2020 | Su et al. |
| 2021/0042351 | A1 | 2/2021 | Moore et al. |
| 2021/0352362 | A1 | 11/2021 | Moore et al. |
| 2022/0319552 | A1 | 10/2022 | Collins et al. |
| 2023/0274547 | A1 | 8/2023 | Haim et al. |
| 2023/0319346 | A1 | 10/2023 | Panchaksharaiah et al. |
| 2024/0364960 | A1 | 10/2024 | Borzic et al. |

FOREIGN PATENT DOCUMENTS

| | | | |
|---|---|---|---|
| EP | 4335111 | A1 | 3/2024 |
| WO | 2010/119181 | A1 | 10/2010 |
| WO | 2015/127385 | A1 | 8/2015 |

OTHER PUBLICATIONS

U.S. Appl. No. 18/539,831, filed Dec. 14, 2023. Title: Systems and Methods for Optimizing Reengagement With a Content Item by Leveraging Advanced Memory-Related Techniques (Not provided; USPTO in possession of specification, claims, and prosecution history).

Rust NC., et al., "Understanding Image Memorability", Trends In Cognitive Sciences, Elsevier Science, vol. 24, No. 7, May 5, 2020, pp. 557-568 (25 Pages).

* cited by examiner

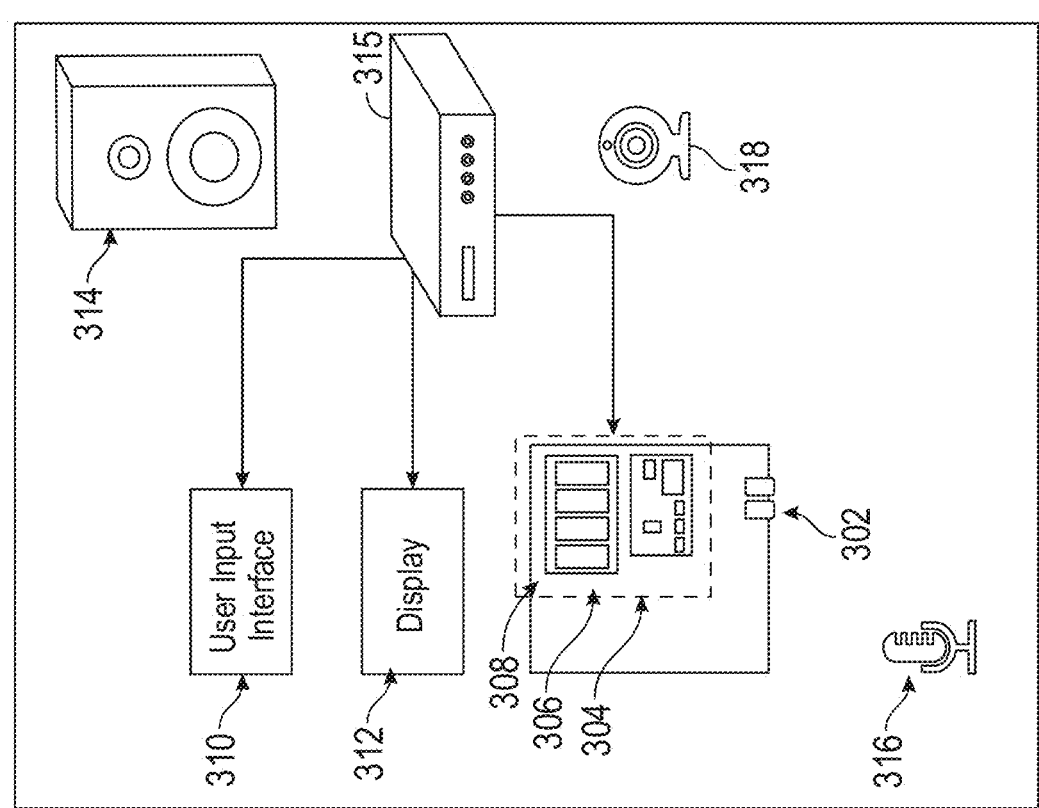
FIG. 3
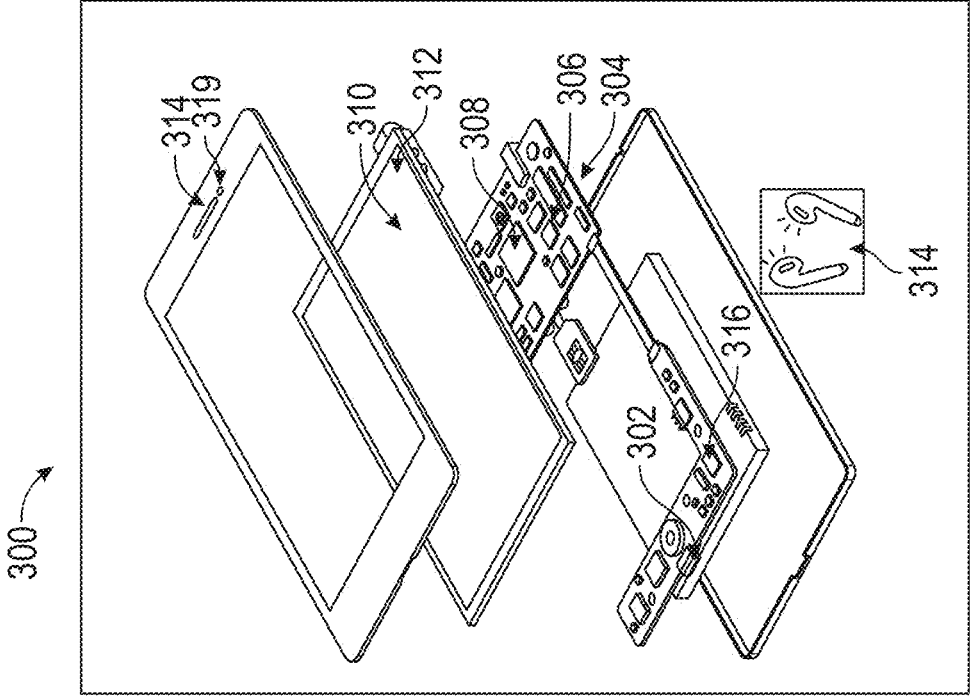

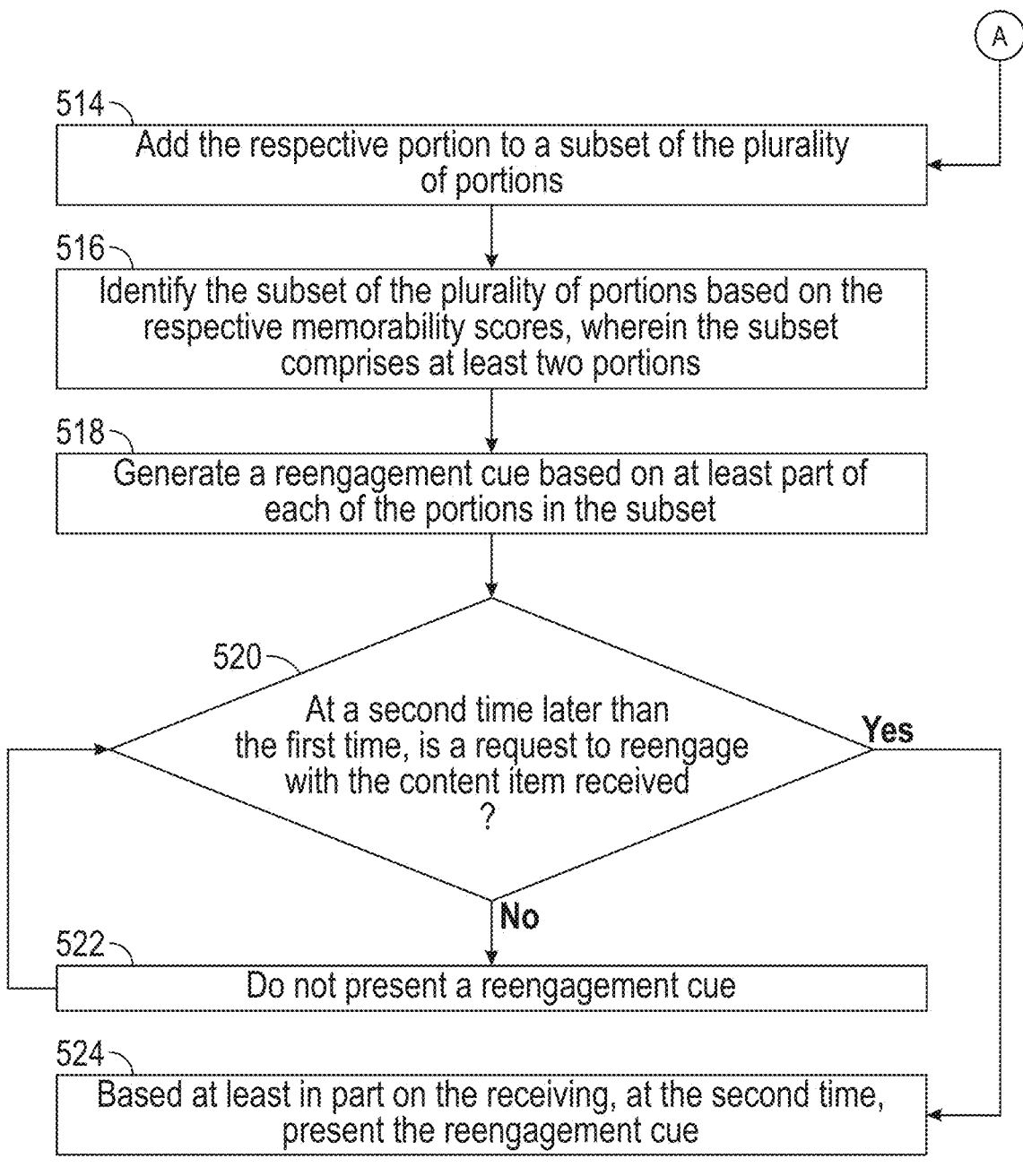

514 — Add the respective portion to a subset of the plurality of portions

516 — Identify the subset of the plurality of portions based on the respective memorability scores, wherein the subset comprises at least two portions 518 — Generate a reengagement cue based on at least part of each of the portions in the subset 520 — At a second time later than the first time, is a request to reengage with the content item received ?

Yes

No

522 — Do not present a reengagement cue

524 — Based at least in part on the receiving, at the second time, present the reengagement cue

SYSTEMS AND METHODS FOR OPTIMIZING REENGAGEMENT WITH A CONTENT ITEM BY LEVERAGING ADVANCED MEMORY-RELATED TECHNIQUES

BACKGROUND

This disclosure is directed to systems and methods for optimizing reengagement with a content item by leveraging advanced memory-related techniques.

SUMMARY

Most content systems allow users to pause consumption of a content item and continue consumption at a later time. Often, users are unable to recall details of the content they previously consumed. Additionally, many users may disengage with the content item before explicitly pausing the content item, such as by falling asleep or becoming distracted by another activity. Content systems are often limited in their ability to effectively help users recall where they left off after a period of disengagement. In some approaches, systems provide static images or generic catch-up videos to jog a user's memory of a given content item. For example, systems may provide thumbnail images as the system performs trick play during the content item (e.g., while a user scrubs on the scrub bar). These static images or catch-up reels may be personalized based on a user's preferences. However, these approaches do not adapt images and/or videos to a user's specific memory pattern, often resulting in the user re-watching large portions of content to find the point in the content item at which they stopped watching and/or to recall the details of the content they watched. In some cases, the user's memory pattern refers to a user's recognition and/or recollection of a content item. In other cases, the user's memory pattern refers to the user generally recognizing and/or recalling some attributes of content items better than other attributes. Rewinding content items unnecessarily uses computing resources and bandwidth and may unnecessarily waste a user's time.

In some approaches, systems may use a machine learning model to generate tailored content summaries that help users recall plot points or information after a pause in viewing, using static formats like text, images, or video summaries to facilitate reengagement. However, such approaches also lack a focus on facilitating content recognition through personalized, dynamic reengagement cues. Moreover, these approaches do not utilize data structures that track the viewing progress of content items based on user interface inputs. There exists a need for an optimized machine learning model to dynamically generate a personalized reengagement cue to assist users in reengaging with content items after periods of disengagement.

To help address these problems, the systems, methods, and apparatuses disclosed herein may be configured to optimize reengagement with a content item by leveraging advanced memory-related techniques. In some embodiments, at a first time, a reengagement system determines that a user has disengaged from consuming a content item at a first position within the content item. To make this determination, during presentation of the content item the reengagement system may determine that a threshold amount of time has elapsed without receiving a user input, wherein the user is determined to be disengaged based at least in part on the threshold amount of time being elapsed. For example, when the reengagement system does not receive an indication of motion from a remote control wirelessly connected to the user device that is displaying the content item for some threshold period of time (e.g., one hour), the reengagement system may determine that the user has disengaged from consuming the content item. After determining that the user has disengaged, in some implementations, the reengagement system determines a reengagement cue for the content item.

For example, the reengagement system may identify the most memorable parts of the content item that occurred from the beginning of the content item up to the point at which the user disengaged and use these memorable parts to generate a reengagement cue. In some embodiments, the reengagement system uses one or more of a bubble search, a binary search, a Fibonacci search, an interpolation search, an exponential search, any other suitable search algorithm, or any suitable combination thereof to identify the most memorable parts of the content item. In some embodiments, the reengagement cue comprises at least one image, at least one video segment, at least one audio segment, or any suitable combination thereof. In some implementations, the reengagement cue is a thumbnail. In some embodiments, to determine the reengagement cue, the reengagement system selects a plurality of portions of the content item, wherein the plurality of selected portions of the content item are positioned in the content item prior to a first position within the content item. For example, if the reengagement system detects user disengagement at approximately 20 minutes into a TV show episode, the reengagement system selects the plurality of portions of the TV show episode that are before the 20-minute position (e.g., the first 20 minutes of the episode). This enables the reengagement system to utilize only relevant portions of the content item.

In some implementations, the plurality of portions of the content item may be selected based at least in part on one or more of a bubble search, a binary search, a Fibonacci search, an interpolation search, an exponential search, any other suitable search algorithm, or any suitable combination thereof. In some embodiments, the reengagement system trains a neural network to determine a memorability score associated with one or more frames, segments, or portions of a media content item. The reengagement system may train the neural network with a plurality of memorability datasets, which may comprise pre-annotated media samples for which human memory performance has been quantified.

In some implementations, the reengagement system determines, for each of the plurality of portions, a respective memorability score. Such aspects enable the reengagement system to prioritize portions of the content item that are most memorable to the specific user and are therefore more likely to remind the user what took place in the content item prior to the user's disengagement. The reengagement system may determine, for each of the plurality of portions, the respective memorability score by inputting each of the plurality of portions into the trained neural network and outputting, from the trained neural network, the respective memorability score for each of the plurality of portions. For example, the reengagement system may determine that the memorability score for one portion of the content item is 0.85 and the memorability score for another portion of the content item is 0.71. In some embodiments, the reengagement system identifies a subset of the plurality of portions based on the respective memorability scores (e.g., by selecting the portions with the highest memorability scores), wherein the subset comprises at least two portions. The reengagement system may update the memorability scores and/or the subset selection process over time as the reengagement system learns more about the user's behavior. For instance, while the neural network may be trained on a data set reflecting memorability scores for an average user, a given user's preferences may be different from the average user's.

As a result, the most effective portions for jogging a given user's memory about a content item may be different from the portions that have the overall highest memorability scores for the average user. As more feedback about the user's preferences is received, the portion selection process may be tailored to that specific user. Such aspects ensure that the reengagement system evolves to meet individual cognitive and memory-based needs. Depending on the content item, the user, and/or one or more other factors, the subset of the plurality of portions may comprise at least one visual portion and/or at least one audio portion. In some embodiments, the respective memorability score of each portion of the subset of the plurality of portions exceeds a threshold memorability score (e.g., selecting only portions have a score above 0.8). The threshold memorability score may be predetermined by the reengagement system based on the content item, user preferences, or some other consideration or combination thereof, and/or may be updated over time (e.g., based on user feedback).

In some implementations, the reengagement system generates the reengagement cue based on at least part of each of the portions in the subset. That is, if the subset of portions includes five portions, the generated reengagement cue may include part of each of the five portions. In some implementations, wherein the reengagement cue is a thumbnail, the thumbnail is a synthesized image based on at least part of each of the portions in the subset. The reengagement system may generate the reengagement cue by synthesizing the portions in the subset using a generative adversarial network (GAN). For example, if the subset of selected portions includes three visual elements (e.g., a close-up of the main character, a key plot item, and an explosion), the reengagement system may generate a synthesized image using a GAN that includes each of those three visual elements. In another example, if the subset of selected portions includes a visual portion and an audio portion (e.g., a reaction shot of the main character and a memorable song that is played during the content item), the reengagement system may generate a synthesized output comprising an image along with corresponding audio based on the visual portion and the audio portion.

In some embodiments, based at least in part on receiving, at a second time later than the first time, a request to reengage the content item, the reengagement system presents the reengagement cue. In one example, the reengagement system may present the reengagement cue based on receiving a selection of a content item identifier. For instance, when the user opens a streaming application and navigates to the "continue watching" section, the reengagement cue may be presented upon the user selecting the content item identifier for the content item. In another example, the reengagement system may present the reengagement cue at a graphical user interface (GUI) displaying a plurality of content item identifiers. For instance, when the user opens a streaming application and navigates to the "continue watching" section, the reengagement cue may be presented in place of the standard content item identifier for the content item. In some embodiments, the reengagement cue comprises portions of the content item that the reengagement system predicts have been missed by the user.

In some implementations, the reengagement system generates for display a plurality of reengagement cues based on the at least part of each of the portions in the first subset. For example, the reengagement system may present three different reengagement cues at a user interface of a user device that displays the content item. This may enable the user to select which of the three reengagement cues is most effective, and thereby provide feedback to improve the reengagement system. In some embodiments, the reengagement system receives a selection of a first reengagement cue of the plurality of reengagement cues. Based on the selection of the first reengagement cue, in some implementations, the reengagement system updates a user selection criterion and identifies a second subset of the plurality of portions based at least in part on the updated user selection criterion. The reengagement system may determine one or more user selection criteria over time, as the reengagement system receives user selections of reengagement cues. The reengagement system may use one or more of a bubble search, a binary search, a Fibonacci search, an interpolation search, an exponential search, any other suitable search algorithm, or any suitable combination thereof to determine the one or more user selection criteria over time.

In some embodiments, the reengagement system generates for display a reengagement cue with a plurality of visual elements. The reengagement system may also generate for display a user-selectable option that indicates that the user does not recognize one or more of the visual elements. The user-selectable option may be an arrow pointing to one of the visual elements, or the visual element itself may be user-selectable. The reengagement system may receive a selection of the user-selectable option via a remote control paired to the user device displaying the reengagement cue (e.g., via a button on the remote or pointing the remote toward the user-selectable option), a smartphone paired to the user device displaying the reengagement cue, a user gaze, and/or a user gesture. Such aspects enable the reengagement system to further personalize future reengagement cues by learning when the user disengages from content items.

For example, the reengagement system may update the user selection criterion to be "Favorite actor=Timothée Chalamet" upon receiving a user selection of a reengagement cue comprising an image of Timothée Chalamet. Thus, when the reengagement system identifies a second subset of the plurality of portions, the reengagement system may select portions for the second subset in which Timothée Chalamet is visually on-screen or can be heard in audio, even if that portion does not have the overall highest memorability score for the average user according to the neural network. In some implementations, the reengagement system identifies a user device used to present the content item. The user device may be a television, a smartphone, a laptop, any other suitable user device, or any suitable combination thereof. For example, the reengagement system determines that the user device presenting the TV show is a 65-inch television capable of 4K resolution. In some embodiments, the reengagement system determines a modified reengagement cue based on the user device and presents the modified reengagement cue. For example, the reengagement system modifies the reengagement cue to include more detail because the television screen is large (i.e., relative to a smartphone screen) and has high resolution.

Alternatively, if the reengagement system determines that the user device is a smartphone with a relatively small screen, the reengagement system may select fewer portions to be synthesized into the reengagement cue, or may reduce a resolution, to compensate for the smaller screen size. In some implementations, the reengagement system embeds the respective memorability score for each portion of the plurality of portions into at least one manifest of the content item. For example, the respective memorability scores may be mapped to respective frames within the corresponding portions. The reengagement system may query the manifest to locate the appropriate portion based on receiving an indication of reengagement from the user device.

In some embodiments, the reengagement system generates for display a plurality of reengagement cues in a plurality of positions along a timeline of the content item, wherein the plurality of positions correspond to a plurality of timepoints of the content item. In some implementations, the reengagement system determines a selected reengagement cue of the plurality of reengagement cues based on a user interface input. In some embodiments, the reengagement system presents the content item beginning at a first timepoint corresponding to the selected reengagement cue.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 depicts illustrative user equipment devices and systems, in accordance with some embodiments of this disclosure.

FIGS. 5A and 5B is a flowchart of a detailed illustrative process for optimizing reengagement with a content item by leveraging advanced memory-related techniques, in accordance with some embodiments of this disclosure.

FIG. 8 is a sequence diagram of a detailed illustrative process for generating a reengagement cue using generative AI, in accordance with some embodiments of this disclosure.

DETAILED DESCRIPTION

Figure 1:
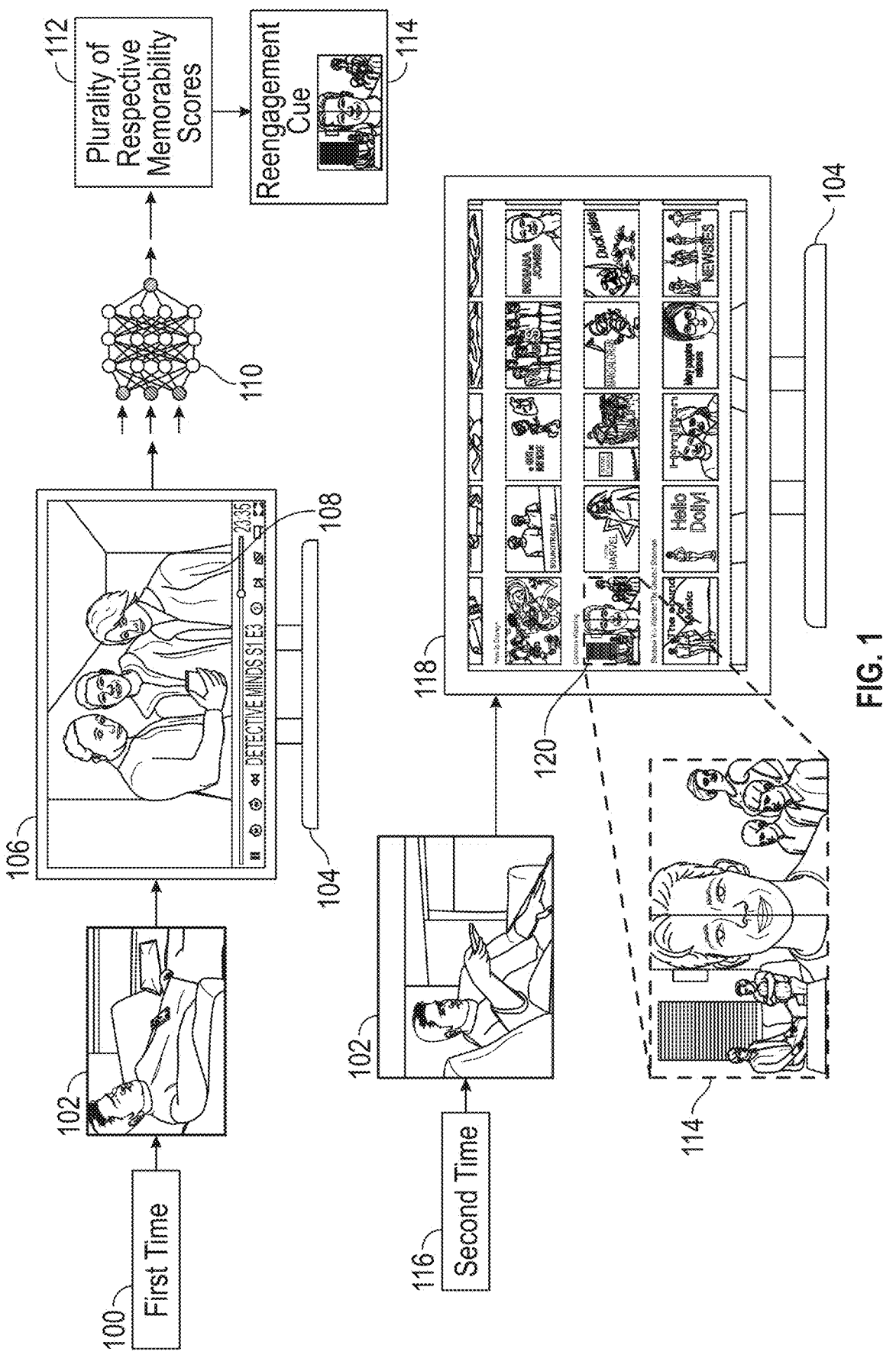
FIG. 1 shows an illustrative example of a process for optimizing reengagement with a content item by leveraging advanced memory-related techniques, in accordance with some embodiments of this disclosure.

FIG. 1 shows an illustrative example of optimizing reengagement with a content item by leveraging advanced memory-related techniques, in accordance with some embodiments of this disclosure. FIG. 1 illustrates a reengagement system configured to perform various functions described herein. In some embodiments, the reengagement system comprises or corresponds to an application that may be executed at least in part on a server (e.g., media content source 402 and/or one or more servers 404 of FIG. 4), a user equipment device (e.g., user device 104 of FIG. 1, devices 406, 407, 408, and/or 410 of FIG. 4, such as, for example, a laptop computer, a personal computer, a desktop computer, a smart television, a smart watch or wearable device, smart glasses, a stereoscopic display, a wearable camera, XR glasses, XR goggles, an XR HMD, a near-eye display device, etc.), or any other suitable user equipment or computing device, or any combination thereof. The application and/or system may comprise or employ any suitable number of displays, sensors, or devices such as those described herein, or any other suitable software and/or hardware components, or any combination thereof.

In some embodiments, user device 104 (e.g., a television) runs a media application (e.g., Netflix, Hulu, Max, or any other suitable streaming service application) and the reengagement system. A server may provide streaming data of content item 106 (e.g., season one, episode 3 of a TV show called "Detective Minds") to user device 104. User device 104 may be logged in to a user account for the media application. A user account is created when a user device requests access to a streaming service or any other suitable media provider. A user account provides user devices access to a streaming service's media catalogue. A user account may have one set of credentials that allow access to the account. User device 104 generates for display content item 106 at a user interface of user device 104 for consumption by user 102.

In some embodiments, at first time 100, the reengagement system determines that user 102 has disengaged from consuming content item 106 at first position 108 (e.g., the last user interaction point) within content item 106. A user may be disengaged from consuming content when the user is not paying attention to the content, falls asleep, leaves the room, any other suitable disengagement behavior, or any suitable combination thereof. In some embodiments, the reengagement system may monitor phone activity of the phone of user 102 (e.g., whether user 102 is scrolling social media) to identify time periods in which user 102 was not paying attention to visual content of content item 106. In some embodiments, the reengagement system uses available sensor data of user device 104 and/or available sensor data of any other suitable user device (e.g., RGB cameras, lidar, infrared) to apply skeletal reconstruction techniques and identify whether user 102's head is pointed at their phone and/or whether their fingers are moving across the phone screen.

During presentation of content item 106, in some implementations, the reengagement system determines that a threshold amount of time has elapsed without receiving a user input. The reengagement system may determine that user 102 is disengaged from content item 106 based at least in part on determining that a threshold amount of time has elapsed without receiving a user input. The reengagement system may determine the threshold amount of time by receiving an explicit user input indicating the threshold amount of time or based on prior disengagement data collected during prior content consumption sessions of user 102 and/or other users who have consumed content item 106. The reengagement system may receive a user input from a remote paired to user device 104, a smartphone paired to user device 104, a gaze of user 102, a gesture from user 102, and/or an input from any other suitable device or system connected to the reengagement system. For example, the reengagement system may determine that the threshold amount of time is 20 minutes without receiving a user input.

In some embodiments, the reengagement system detects disengagement of user 102 using sensors of user device 104, using sensors of a secondary user device in proximity of user device 104 (e.g., a smartphone, tablet, smart watch, any other suitable user device, or any combination thereof), detecting activity on the secondary user device, any other disengagement detection technique, or any suitable combination thereof. In some implementations, the reengagement system detects disengagement of user 102 based on loudness equalization of content item 106. The reengagement system and/or a loudness equalization system of user device 104 may apply loudness equalization techniques to prevent loud sounds in content item 106 from waking up user 102 upon detecting that user 102 has fallen asleep. Loudness equalization uses dynamic gain adjustment to reduce the loudness of loud noises and increase the loudness of quieter sounds. The strength of loudness equalization may be adjusted to make sound more or less consistent. The loudness equalization system may automatically increase the strength of loudness equalization as more time passes without detected activity from user 102, which may indicate that user 102 has fallen asleep.

In some embodiments, the reengagement system determines reengagement cue 114 for content item 106. In some embodiments, reengagement cue 114 comprises at least one image, at least one video segment, at least one audio segment, or any suitable combination thereof. In some implementations, to determine the reengagement cue, the reengagement system selects a plurality of portions of content item 106, wherein the plurality of portions of content item 106 are positioned in content item 106 prior to first position 108 (e.g., the last user interaction point) within content item 106. First position 108 may indicate the last user interaction with content 106 (e.g., a rewind operation, a pause operation, any other suitable trick-play operation, any suitable user input, or any suitable combination thereof). In some implementations, the reengagement system defines a window between first position 108 and the last known player position (e.g., the position within content item 106 when the user device stopped generating for display content item 106).

For example, if I LAST is the last interaction point and P LAST is the last player position, then the window of operation would be [P LAST-I LAST]. The position at which user 102 disengaged from consuming content item 106 may be within the window [P LAST-I LAST]. In some embodiments, the reengagement system uses at least one of a plurality of search algorithms such as bubble search, binary search, Fibonacci search, interpolation search or exponential search to locate a timestamp at which the user has recollection of the last watched frame. The plurality of portions of content item 106 may include the portions of video and audio from the beginning of content item 106 to first position 108 (e.g., 23 minutes and 35 seconds into content item 106) and/or the plurality of portions within the window [P LAST-I LAST]. In some embodiments, the reengagement system inputs each of the plurality of portions into neural network 110.

In some embodiments, the reengagement system determines one or more time periods during which user 102 was distracted, such as by looking at a secondary user device (e.g., a smartphone, tablet, smart watch, any other suitable user device, or any combination thereof). The reengagement system may exclude portions of content item 106 that occurred during these time periods from the plurality of portions, as user 102 will likely not recognize these portions. The reengagement system may also exclude portions of content item 106 that occurred while the user 102 was asleep, such as portions that occurred during time periods of increased loudness equalization.

The reengagement system may train neural network 110 using machine learning, such as support vector machines (SVMs), multilayer perceptrons (MLPs), convolutional neural networks (CNNs), any other suitable machine learning algorithm, or any suitable combination thereof. The reengagement system may train neural network 110 with a plurality of memorability datasets. The plurality of memorability datasets may comprise pre-annotated media samples where human memory performance has been quantified, enabling neural network 110 to predict which portions of content 106 are likely to be recalled by users. In some implementations, the reengagement system determines, for each of the plurality of portions, a respective memorability score (e.g., plurality of respective memorability scores 112). The reengagement system may determine the memorability scores using trained neural network 110 by outputting, from the neural network 110, the respective memorability score for each of the plurality of portions.

The reengagement system, via neural network 110, may determine each respective memorability score using memorability mapping based on a combination of factors such as visual complexity, emotional intensity, and the presence of distinct or repeated elements in the plurality of portions of content item 106. For example, a highly emotional scene featuring a close-up of a character's face may receive a higher memorability score due to its emotional weight and visual prominence, whereas a transitional scene with no significant actions may receive a lower score. As an example, the reengagement system may analyze three key frames in a 10-second segment from content item 106. The first frame shows the main character entering a dimly lit room. This scene lacks significant narrative or emotional weight, as it serves merely as a transition without any defining visual or emotional cues. The visual complexity is low, and the emotional intensity is minimal. The contextual importance is limited because the frame functions as a setup rather than a critical plot point. Given these factors, the reengagement system calculates a memorability score of 0.35 for this frame, reflecting its low likelihood of being recalled by user 102.

The second frame captures a close-up of the villain's face during a pivotal moment, revealing a major plot twist. The reengagement system determines a high memorability score for the second frame because it combines several key elements. The visual complexity is significant due to dramatic facial expression and the peaks of emotional intensity as the plot twist unfolds, as well as contextually critical to the narrative, marking a turning point in the story. The distinctiveness of the villain's expression and the dramatic lighting further enhance its memorability. Thus, the reengagement system assigns this frame a memorability score of 0.90, indicating a strong likelihood of recall. The third frame presents a wide shot of both characters standing in the room. While this frame provides spatial context, it lacks the focused emotional intensity of the second frame. The visual complexity is moderate, and the emotional intensity remains low, as there is no significant action or dialogue. The frame holds some contextual importance by showing the character positions, but it does not carry the narrative weight of the previous frame. With these factors considered, the reengagement system calculates a memorability score of 0.50 for this frame, reflecting a moderate likelihood of recall.

In this scenario, the reengagement system may prioritize the second frame with its high memorability score of 0.90, making it the most likely candidate to be used as part of reengagement cue 114. In some embodiments, the reengagement system continuously updates the memorability map as it processes new content or learns from interactions from user 102 and/or other users who have consumed content on the media application. For example, if the reengagement system detects that user 102 frequently re-watches scenes with high emotional content, it will adjust future reengagement cues to prioritize similar scenes, ensuring that user 102 receives the most relevant and memorable portions of content item 106 when resuming their media experience. Example calculations for the three frames are shown below and based on the factors contributing to the memorability score (e.g., visual complexity, emotional intensity, contextual importance, and distinctiveness).

Example weights are as follows:

| Memorability Factor | Weight |
| --- | --- |
| Visual Complexity | 40% weight |
| Emotional Intensity | 30% weight |
| Contextual Importance | 20% weight |
| Distinctiveness | 10% weight |

Frame 1: Main character entering a dimly lit room.

| Memorability Factor | Factor Score |
| --- | --- |
| Visual Complexity | Low—0.3 |
| Emotional Intensity | Minimal—0.2 |
| Contextual Importance | Limited, (transition frame)—0.3 |
| Distinctiveness | Not unique or memorable—0.2 |

The final memorability score for Frame 1 is calculated using the weighted formula:

$$\text{Memorability Score (Frame 1)}=(0.3\times0.4)+(0.2\times0.3)+(0.3\times0.2)+(0.2\times0.1)$$

$$\text{Memorability Score (Frame 1)}=0.12+0.06+0.06+0.02=0.26$$

Frame 2: Close-up of the villain's face revealing a plot twist.

| Memorability Factor | Factor Score |
| --- | --- |
| Visual Complexity | High, visually dramatic—0.8 |
| Emotional Intensity | Very high, pivotal plot twist—0.9 |
| Contextual Importance | Critical to the narrative—0.9 |
| Distinctiveness | Strongly distinctive, villain's facial expression—0.8 |

The final memorability score for Frame 2 is calculated using the weighted formula:

$$\text{Memorability Score (Frame 2)}=(0.8\times0.4)+(0.9\times0.3)+(0.9\times0.2)+(0.8\times0.1)$$

$$\text{Memorability Score (Frame 2)}=0.32+0.27+0.18+0.08=0.85$$

Frame 3: Wide shot of two characters standing.

| Memorability Factor | Factor Score |
| --- | --- |
| Visual Complexity | Moderate—0.5 |
| Emotional Intensity | Low, no significant dialogue or action—0.3 |

-continued

| Memorability Factor | Factor Score |
| --- | --- |
| Contextual Importance | Moderate, spatial context but not advancing the plot—0.4 |
| Distinctiveness | Standard—0.4 |

The final memorability score for Frame 3 is calculated using the weighted formula:

$$\text{Memorability Score (Frame 3)}=(0.5\times0.4)+(0.3\times0.3)+(0.4\times0.2)+(0.4\times0.1)$$

$$\text{Memorability Score (Frame 3)}=0.20+0.09+0.08+0.04=0.41$$

| Summary of Memorability Scores | |
| --- | --- |
| Frame 1 | 0.26 |
| Frame 2 | 0.85 |
| Frame 3 | 0.41 |

In this example, the reengagement system may prioritize Frame 2 with its high memorability score of 0.85 for use in reengagement cue 114, as it represents the most visually and emotionally impactful moment in the scene.

In some embodiments, to determine reengagement cue 114, the reengagement system identifies a subset of the plurality of portions based on the respective memorability scores, wherein the subset comprises at least two portions. For example, the subset may comprise a visual portion and an audio portion of content item 106. In some implementations, the respective memorability score of each portion of the subset of the plurality of portions exceeds a threshold memorability score. The reengagement system may determine a threshold memorability score based on an average memorability score of the memorability scores of the plurality of portions. For example, if the average memorability score of the plurality of portions is 0.6, then the reengagement will not select any portion of the plurality of portions that is assigned a memorability score under 0.6 for the subset of the plurality of portions.

In some implementations, the reengagement system generates reengagement cue 114 based on at least part of each of the portions in the subset. In some implementations, reengagement cue 114 is a thumbnail. The thumbnail may be an image representing video or videos (e.g., a movie, show, sporting event, etc.), and may be or include "cover art" for the video or videos. In some instances, the thumbnail may include one or more images corresponding to frames of the video or videos (e.g., frames from content item 106). In some instances, the thumbnail may be a synthesized image based on at least part of each of the portions in the subset of the plurality of portions of content item 106. In some embodiments, the thumbnail is presented as part of a graphical user interface (GUI) for a platform that enables a user to select content (e.g., audio and/or video) to consume. In such a GUI, the thumbnail may be referred to as a "tile." The thumbnail may be presented, for example, on a page or screen including a plurality of thumbnails or tiles (e.g., arranged in a grid format). By interacting with one of these thumbnails or tiles, the user may watch the corresponding content. In some instances, interacting with a tile or thumbnail may cause the GUI to present a title page for the corresponding content, such as content 106 (e.g., where a trailer is viewable, where episodes for a show may be listed, where the user can download the content, where the user can rate or share the content, or where the user can interact with a GUI element to cause playback of the content). Within such a title page, reengagement cue 114 may be presented (e.g., as a thumbnail).

In some embodiments, reengagement cue 114 is one of a plurality of reengagement cues presented for the content item 106. In some embodiments, the reengagement system generates reengagement cue 114 by synthesizing the at least part of each of the portions in the subset using an artificial intelligence (AI) model such as a generative adversarial network (GAN). For example, the reengagement system uses a GAN to synthesize visual elements from the most memorable portions of the subset of portions of content item 106 (e.g., images of actors central to the plot). The reengagement system may also synthesize audio elements from the most memorable portions of the subset of portions of content item 106. In some embodiments, the reengagement system generates text descriptions of specific frames or scenes using image-to-text or video-to-text techniques. The reengagement system may analyze the text descriptions in isolation or combined to reconstruct the script of content item 106. In some implementations, the reengagement system generates text descriptions of specific frames or scenes using AI models trained to evaluate plot structure and pacing. In some embodiments, the reengagement system may analyze the script directly. The reengagement system may generate for display the text description as part of reengagement cue 114 and/or as an overlay on reengagement cue 114.

In some embodiments, the reengagement system analyzes dialogue of content item 106 to detect uncommon words, phrases, or figures of speech and selects portions coinciding with such phrases. The reengagement system may analyze the dialogue using one or more word frequency databases, which provide the frequency of words and phrases based on a corpus of language collected across literature, media, websites, any other suitable content items, or any suitable combination thereof. The use of uncommon language is generally more memorable than commonly used language. For example, a character describing another as "an angry man" is much less memorable than describing the character as "angrier than a mosquito in a mannequin factory."

In some embodiments, at second time 116, the reengagement system receives a request to reengage with content item 106. Second time 116 is later than first time 100. For example, user device 104 may play content item 106 for the first time at first time 100 (e.g., 8 pm on November 18) and receive a request to play content item 106 again at second time 116 (e.g., 6 pm on November 20). The request may be a user interface input (e.g., selection of a user interface option or a voice command) that launches the media application comprising content item 106, a user interface input to play or resume content item 106, a user interface input selecting an identifier of content item 106, any other suitable user request, or any suitable combination thereof. For example, at second time 116, user 102 uses a remote control coupled to user device 104 to launch the media application comprising access to content item 106. In some implementations, based at least in part on receiving, at second time 116, a request to reengage with content item 106, the reengagement system presents reengagement cue 114. For example, the reengagement system displays reengagement cue 114 at user interface 118 of user device 104 running the media application and the reengagement system.

In some implementations, visual elements and/or audio elements from the subset of portions are captured at a set interval (e.g., 1 Hz) or based on the detection of specific actors. In some implementations, wherein the subset of portions is a first subset, the reengagement system generates for display a plurality of reengagement cues based on the at least part of each of the portions in the first subset. For example, the reengagement system may present three different reengagement cues at user interface 118 of user device 104. In some embodiments, the reengagement system receives a selection of a first reengagement cue of the plurality of reengagement cues. For example, the reengagement system receives a user selection of a reengagement cue comprising an image of Timothée Chalamet for the movie "Little Women" instead of a reengagement cue without an image of Timothée Chalamet. Based on the selection of the first reengagement cue, in some implementations, the reengagement system updates a user selection criterion and identifies a second subset of the plurality of portions based at least in part on the updated user selection criterion. The reengagement system may determine one or more user selection criteria over time, as the reengagement system receives user selections of reengagement cues.

In some embodiments, the reengagement system retrieves user selection criteria (e.g., user preference data) of user 102 from the media application or media history of user 102 from the media application to identify actors or content attributes that user 102 prefers. With preferred actors identified, the reengagement system may identify those celebrities and select portions of content item 106 that contain them to include in reengagement cue 114. For example, when generating a reengagement cue for the movie "Iron Man," the reengagement system may present a user profile with a strong preference for Robert Downey Jr. a reengagement cue showing the actor's face even if that portion does not have the overall highest memorability score for the average user. In contrast, the reengagement system may present a user profile that does not have a preference for Robert Downey Jr. a reengagement cue showing the Iron Man suit in action that has a higher memorability score for the average user.

In some embodiments, the reengagement system generates for display reengagement cue 114 with a plurality of visual elements. The visual elements may be images of actors from content item 106, background visuals from content item 106, visual elements generated by an AI model based on the visual elements of content item 106, any other suitable visual elements, or any suitable combination thereof. The reengagement system may also generate for display a user-selectable option at user interface 118 of user device 104 that indicates that user 102 does not recognize one or more of the visual elements. The user-selectable option may be an arrow pointing to one of the visual elements or the visual element itself may be user-selectable. The reengagement system may receive a selection of the user-selectable option via any suitable input device, such as a remote paired to the user device displaying the reengagement cue (e.g., via a button on the remote or pointing the remote toward the user-selectable option), a smartphone paired to the user device displaying the reengagement cue, a device for detecting a user gaze, and/or a device for detecting a user gesture.

In some embodiments, the reengagement system provides a search feature with the transcript function. The reengagement system may allow user 102 to search for a particular dialogue or scene within content item 106 without going through the entire transcript of content item 106. For example, if user 106 only recollects a scene of "a big boat coming towards a beach" in the movie "Leave the World Behind," user 102 may search for that text in the transcript and retrieve and/or select the respective timestamp. The media application may then continue presenting content item 106 from the respective timestamp. In some implementations, the reengagement system identifies the type of user device 104. For example, the reengagement system determines that user device 104 is a 65-inch television capable of 4K resolution.

In some embodiments, the reengagement system determines and presents a modified reengagement cue based on the type of user device 104. For example, the reengagement system modifies reengagement cue 114 to include more detail because a television screen is large (i.e., relative to a smartphone screen) and has high resolution. In another example, if the reengagement system determines that user device 104 is a smartphone with a relatively small screen, the reengagement system may select fewer portions to be synthesized into reengagement cue 114, or may reduce a resolution, to compensate for the smaller screen size.

In some embodiments, the reengagement system may dynamically tailor reengagement cue 114 based on context at the times of disengagement and reengagement. The reengagement system may collect a plurality of data, including the time of day (e.g., from the media application and/or user device 104) and biometric data of user 102 such as heart rate variability, voice patterns, or physiological signals detected through sensors in the environment and/or user device 104. In some embodiments, the reengagement system analyzes external factors like the emotional tone of content item 106 during disengagement, inferred from sentiment analysis techniques applied to both video and audio streams using machine learning models. For example, if the reengagement system detects that user 102 disengaged late at night while watching a calm scene, the reengagement system may include calming, less stimulating portions of content item 106 in reengagement cue 114. In another example, if user 102 disengaged during an emotional peak, the system may include emotional portions of content item 106 in reengagement cue 114. The reengagement system may cross-reference emotional and contextual data of the portions of content item 106 with memorability scores calculated from prior analysis.

In some embodiments, the reengagement system generates for display a plurality of reengagement cues in a plurality of positions along a timeline of content item 106, wherein the plurality of positions correspond to a plurality of timepoints of content item 106. For example, after receiving an initial user selection to resume content item 106, the reengagement system may display the plurality of reengagement cues as thumbnails along the scrub bar of content item 106. Each reengagement cue of the plurality of reengagement cues may comprise content that occurred prior to the respective position of the reengagement cue. For example, a reengagement cue displayed at a 20-minute timepoint may comprise visual and/or audio portions of the content item from 0-20 minutes. In another example, a reengagement cue displayed at a 30-minute timepoint may comprise visual and/or audio portions of the content item from 0-30 minutes. The plurality of reengagement cues may comprise varying visual portions.

In some implementations, the reengagement system determines a selected reengagement cue of the plurality of reengagement cues based on a user interface input. The user interface input may be a selection, via user device 104 or a secondary device coupled to user device 104, of the selected reengagement cue or a voice command. In some embodiments, the reengagement system presents content item 106 beginning at a first timepoint corresponding to the selected reengagement cue. Such aspects enable the reengagement system to display content item 106 at the timepoint most remembered by the user.

Figure 2:
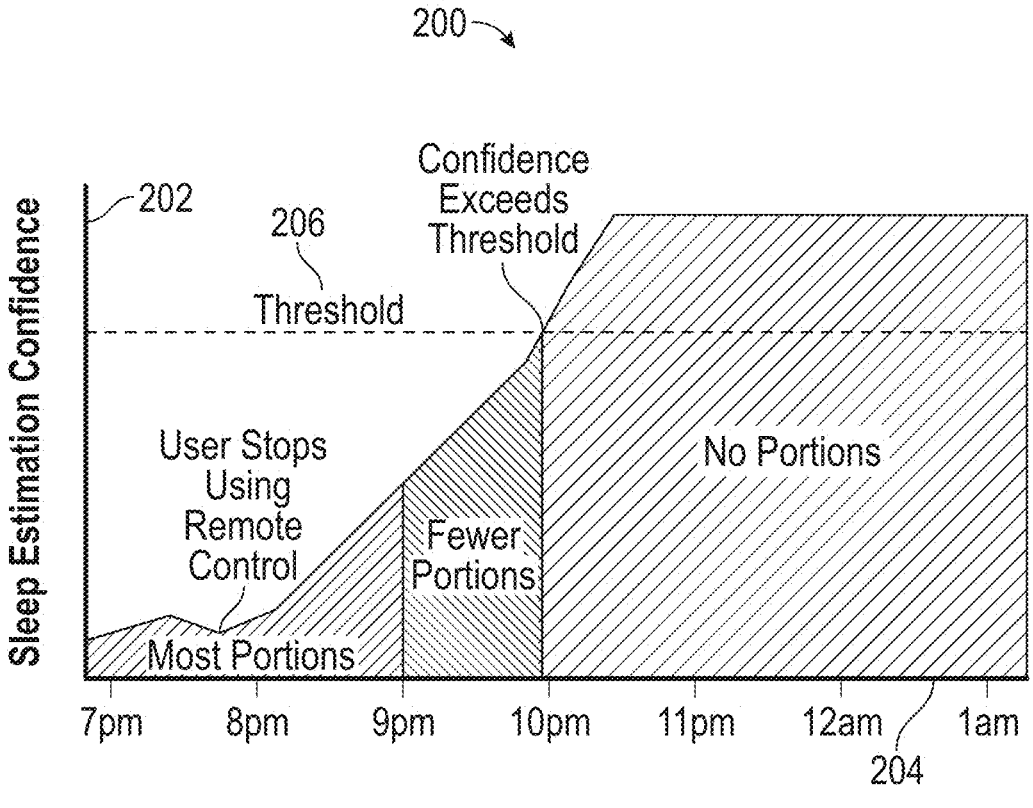
FIG. 2 shows an illustrative example of how portions of content may be selected based on a function of sleep estimation confidence, in accordance with some embodiments of this disclosure.

FIG. 2 shows an illustrative example of selecting portions of content based on a function of sleep estimation confidence. In some embodiments, a user device (e.g., user device 104 of FIG. 1) runs a media application (e.g., Netflix, Hulu, Max, or any other suitable streaming service application) and a reengagement system (e.g., the reengagement system as described in connection with FIG. 1). A server may provide streaming data of a content item (e.g., content item 106 of FIG. 1) to user device 104. User device 104 may be logged in to a user account for the media application. User device 104 generates for display content item 106 at a user interface of user device 104 for consumption by a user (e.g., user 102 of FIG. 1).

In some embodiments, the reengagement system estimates the likelihood of user 102 having fallen asleep by considering how much time has passed since user 102 has interacted with the media controls (e.g., remote control, smartphone, mouse and keyboard, any other suitable media control, or any suitable combination thereof), available sensor data (e.g., RGB cameras, smart watches, any other suitable sensor of a user device, or any suitable combination thereof), or any suitable combination thereof. The reengagement system may use any technique, such as those described in connection with FIG. 1, to detect user disengagement from content item 106. For example, the reengagement system determines, via media control data, that user 102 has stopped using the remote control coupled with user device 104. The likelihood of user disengagement (e.g., user 102 having fallen asleep) may be represented as a series of confidence values over time (e.g., shown in graph 200).

Graph 200 shows a distribution of portions used for a reengagement cue (e.g., reengagement cue 114 of FIG. 1) as a function of sleep estimation confidence. In some implementations, graph 200 comprises x-axis 204 of times (e.g., 7 pm, 8 pm, etc.) and y-axis 202 of sleep estimation confidence values. In some embodiments, the reengagement system identifies the moment at which the sleep estimation confidence value exceeds threshold 206 (e.g., user 102 is more likely than not to be asleep). The reengagement system may not include portions of content item 206 during which the confidence value stays above threshold 206 in reengagement cue 114. The reengagement system may also include in reengagement cue 114 more portions around specific detected events such as the last interaction with a remote control or the next episode of a show beginning.

Figure 4:
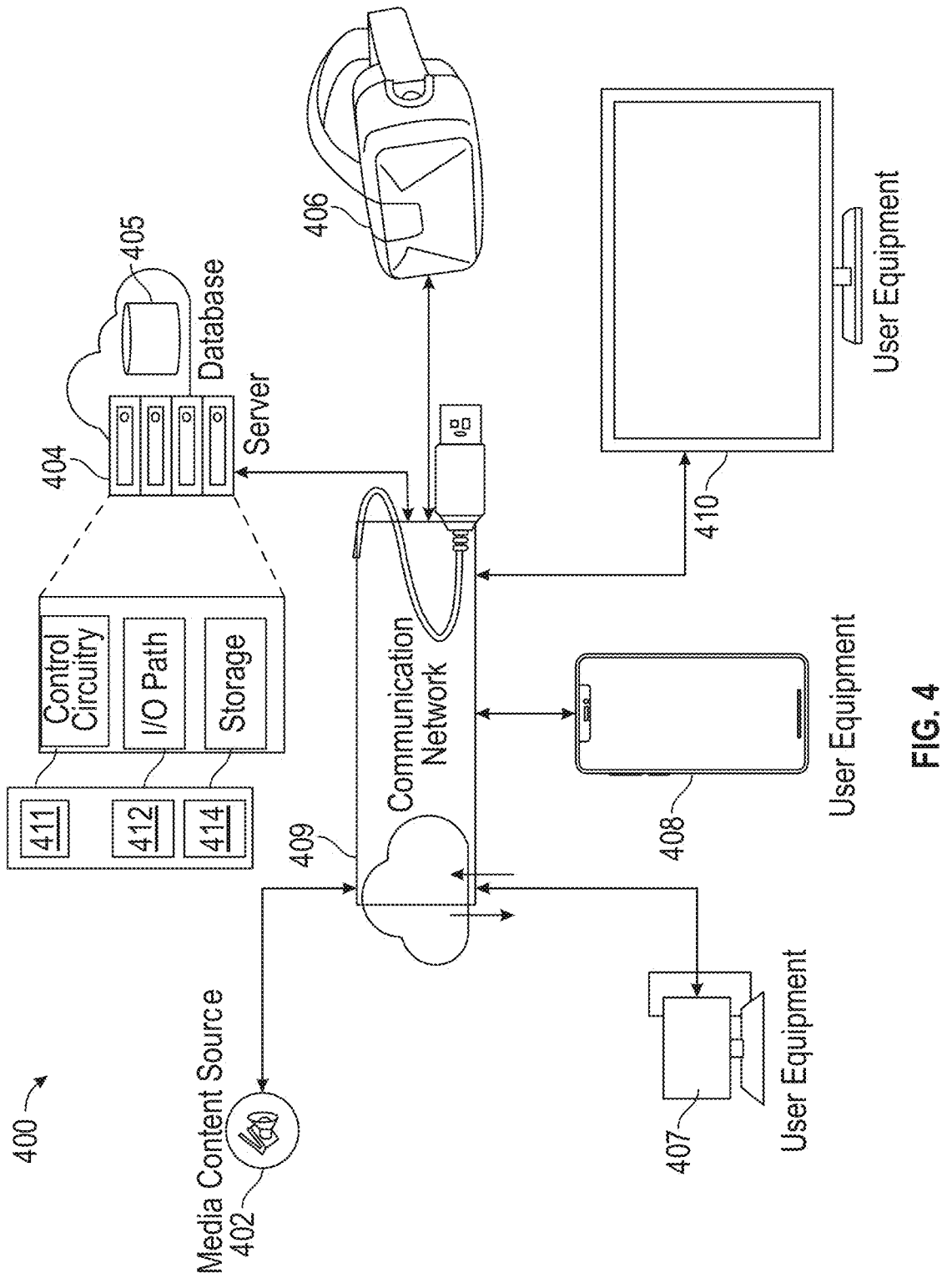
FIG. 4 depicts illustrative user equipment devices and systems, in accordance with some embodiments of this disclosure.

FIGS. 3-4 describe illustrative devices, systems, servers, and related hardware for optimizing reengagement with a content item by leveraging advanced memory-related techniques, in accordance with some embodiments of the present disclosure. FIG. 3 shows generalized embodiments of illustrative user equipment 300 and 301, which may correspond to, e.g., user device 104 of FIG. 1. For example, user equipment 300 may be a smartphone device, a tablet, a near-eye display device, an XR device, or any other suitable device capable of participating in a XR environment, e.g., locally or over a communication network. In another example, user equipment 301 may be a user television equipment system or device. User equipment 301 may include set-top box 315. Set-top box 315 may be communicatively connected to microphone 316, audio output equipment 314 (e.g., speaker or headphones), and display 312. In some embodiments, microphone 316 may receive audio corresponding to a voice of a user and/or ambient audio data. In some embodiments, display 312 may be a television display or a computer display. In some embodiments, set-top box 315 may be communicatively connected to user input interface 310. In some embodiments, user input interface 310 may be a remote-control device. Set-top box 315 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 4. In some embodiments, user equipment 300 may comprise any suitable number of sensors (e.g., gyroscope or gyrometer, or accelerometer, etc.), and/or a GPS module (e.g., in communication with one or more servers and/or cell towers and/or satellites) to ascertain a location of user equipment 300. In some embodiments, user equipment 300 comprises a rechargeable battery that is configured to provide power to the components of the device.

Each one of user equipment 300 and user equipment 301 may receive content and data via input/output (I/O) path 302. I/O path 302 may provide content (e.g., broadcast programming, on-demand programming, internet content, content available over a local area network (LAN) or wide area network (WAN), and/or other content) and data to control circuitry 304, which may comprise processing circuitry 306 and storage 308. Control circuitry 304 may be used to send and receive commands, requests, and other suitable data using I/O path 302, which may comprise I/O circuitry. I/O path 302 may connect control circuitry 304 to one or more communications paths (described below). I/O functions may be provided by one or more of these communications paths but are shown as a single path in FIG. 4 to avoid overcomplicating the drawing. While set-top box 315 is shown in FIG. 3 for illustration, any suitable computing device having processing circuitry, control circuitry, and storage may be used in accordance with the present disclosure. For example, set-top box 315 may be replaced by, or complemented by, a personal computer (e.g., a notebook, a laptop, a desktop), a smartphone (e.g., user equipment 300), an XR device, a tablet, a network-based server hosting a user-accessible client device, a non-user-owned device, any other suitable device, or any combination thereof.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 304 executes instructions for the reengagement system (as described in connection with FIGS. 1-2) stored in memory (e.g., storage 308). Specifically, control circuitry 304 may be instructed by the reengagement system to perform the functions discussed above and below. In some implementations, processing or actions performed by control circuitry 304 may be based on instructions received from the reengagement system.

In client/server-based embodiments, control circuitry 304 may include communications circuitry suitable for communicating with a server or other networks or servers. The reengagement system may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 308, and executed by control circuitry 304 of a user equipment 300.

In some embodiments, the application may be a client/server application where only the client application resides on user equipment 300, and a server application resides on an external server (e.g., server 404 and/or media content source 402). For example, the application may be implemented partially as a client application on control circuitry 304 of user equipment 300 and partially on server 404 as a server application running on control circuitry 411. Server 404 may be a part of a local area network with one or more of user equipment 300, 301 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 404 and/or an edge computing device), referred to as "the cloud." User equipment 300 may be a cloud client that relies on the cloud computing capabilities from server 404 to generate personalized engagement options in a VR environment.

Control circuitry 304 may include communications circuitry suitable for communicating with a server, edge computing systems and devices, a table or database server, or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 5). In addition, communications circuitry may include circuitry that enables peer-to-peer communication of user equipment, or communication of user equipment in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as application data described above.

Nonvolatile memory may also be used (e.g., to launch a boot-up routine and other instructions). Cloud-based storage, described in relation to FIG. 3, may be used to supplement storage 308 or instead of storage 308. Non-transitory memory may store instructions that, when executed by control circuitry, I/O circuitry, any other suitable circuitry or combination thereof, executes functions of an application as described above.

Control circuitry 304 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 304 may also include scaler circuitry for upconverting and downconverting content into the preferred output format of user equipment 300. Control circuitry 304 may also include digital-to-analog converter circuitry and analog-to-digital converter circuitry for converting between digital and analog signals. The tuning and encoding circuitry may be used by user equipment 300, 301 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Control circuitry 304 may receive instruction from a user by way of user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user equipment 300 and user equipment 301. For example, display 312 may be a touchscreen or touch-sensitive display. In such circumstances, user input interface 310 may be integrated with or combined with display 312. In some embodiments, user input interface 310 includes a remote-control device having one or more microphones, buttons, keypads, any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to set-top box 315.

Audio output equipment 314 may be integrated with or combined with display 312. Display 312 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Audio output equipment 314 may be provided as integrated with other elements of each one of user equipment 300 and user equipment 301 or may be stand-alone units. An audio component of videos and other content displayed on display 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. Camera 318 may be any suitable video camera integrated with the equipment or externally connected. Camera 318 may be a digital camera comprising a charge-coupled device (CCD) and/or a complementary metal-oxide semiconductor (CMOS) image sensor. Camera 318 may be an analog camera that converts to digital images via a video card.

The application may be implemented using any suitable architecture. For example, it may be a stand-alone application wholly implemented on each one of user equipment 300 and user equipment 301. In such an approach, instructions of the application may be stored locally (e.g., in storage 308), and data for use by the application is downloaded on a periodic basis (e.g., from an out-of-band feed, from an internet resource, or using another suitable approach). Control circuitry 304 may retrieve instructions of the application from storage 308 and process the instructions to provide video conferencing functionality and generate any of the displays discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Control circuitry 304 may allow a user to provide user profile information or may automatically compile user profile information. For example, control circuitry 304 may access and monitor network data, video data, audio data, processing data, content consumption data, and/or any other suitable data being accessed by a first user (e.g., user 102 of FIG. 1). Control circuitry 304 may obtain all or part of other user profiles that are related to a particular user (e.g., via social media networks), and/or obtain information about the user from other sources that control circuitry 304 may access. As a result, a user can be provided with a unified experience across the user's different devices.

In some embodiments, the application is a client/server-based application. Data for use by a thick or thin client implemented on each one of user equipment 300 and user equipment 301 may be retrieved on demand by issuing requests to a server remote to each one of user equipment 300 and user equipment 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user equipment 300. This way, the processing of the instructions is performed remotely by the server while the resulting displays (e.g., that may include text, a keyboard, or other visuals) are provided locally on user equipment 300. User equipment 300 may receive inputs from the user via user input interface 310 and transmit those inputs to the remote server for processing and generating the corresponding displays. For example, user equipment 300 may transmit a communication to the remote server indicating that an up/down button was selected via user input interface 310. The remote server may process instructions in accordance with that input and generate a display of the application corresponding to the input (e.g., a display that moves a cursor up/down). The generated display is then transmitted to user equipment 300 for presentation to the user.

In some embodiments, the application may be downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

As shown in FIG. 4, user equipment 406, 407, 408, 410 (which may correspond to user equipment, e.g., user device 104 of FIG. 1) may be coupled to communication network 409. Communication network 409 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 409) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 409.

System 400 may comprise media content source 402, one or more servers 404, and/or one or more edge computing devices. In some embodiments, the application may be executed at one or more of control circuitry 411 of server 404 (and/or control circuitry of user equipment 406, 407, 408, 410 and/or control circuitry of one or more edge computing devices). In some embodiments, the media content source and/or server 404 may be configured to host or otherwise facilitate video communication sessions between user equipment 406, 407, 408, 410 and/or any other suitable user equipment, and/or host or otherwise be in communication (e.g., over communication network 409) with one or more social network services.

In some embodiments, server 404 may include control circuitry 411 and storage 414 (e.g., RAM, ROM, Hard Disk, Removable Disk, etc.). Storage 414 may store one or more databases. Server 404 may also include an I/O path 412. In some embodiments, I/O path 412 is an I/O circuitry. I/O circuitry may be a NIC card, audio output device, mouse, keyboard card, any other suitable I/O circuitry device or combination thereof. I/O path 412 may provide video conferencing data, device information, or other data, over a local area network (LAN) or wide area network (WAN), and/or other content and data to control circuitry 411, which may include processing circuitry, and storage 414. Control circuitry 411 may be used to send and receive commands, requests, and other suitable data using I/O path 412, which may comprise I/O circuitry. I/O path 412 may connect control circuitry 411 to one or more communications paths.

Control circuitry 411 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 411 executes instructions for an emulation system application stored in memory (e.g., the storage 414). Memory may be an electronic storage device provided as storage 414 that is part of control circuitry 411. Memory may store instruction to run the application.

Figure 5A:
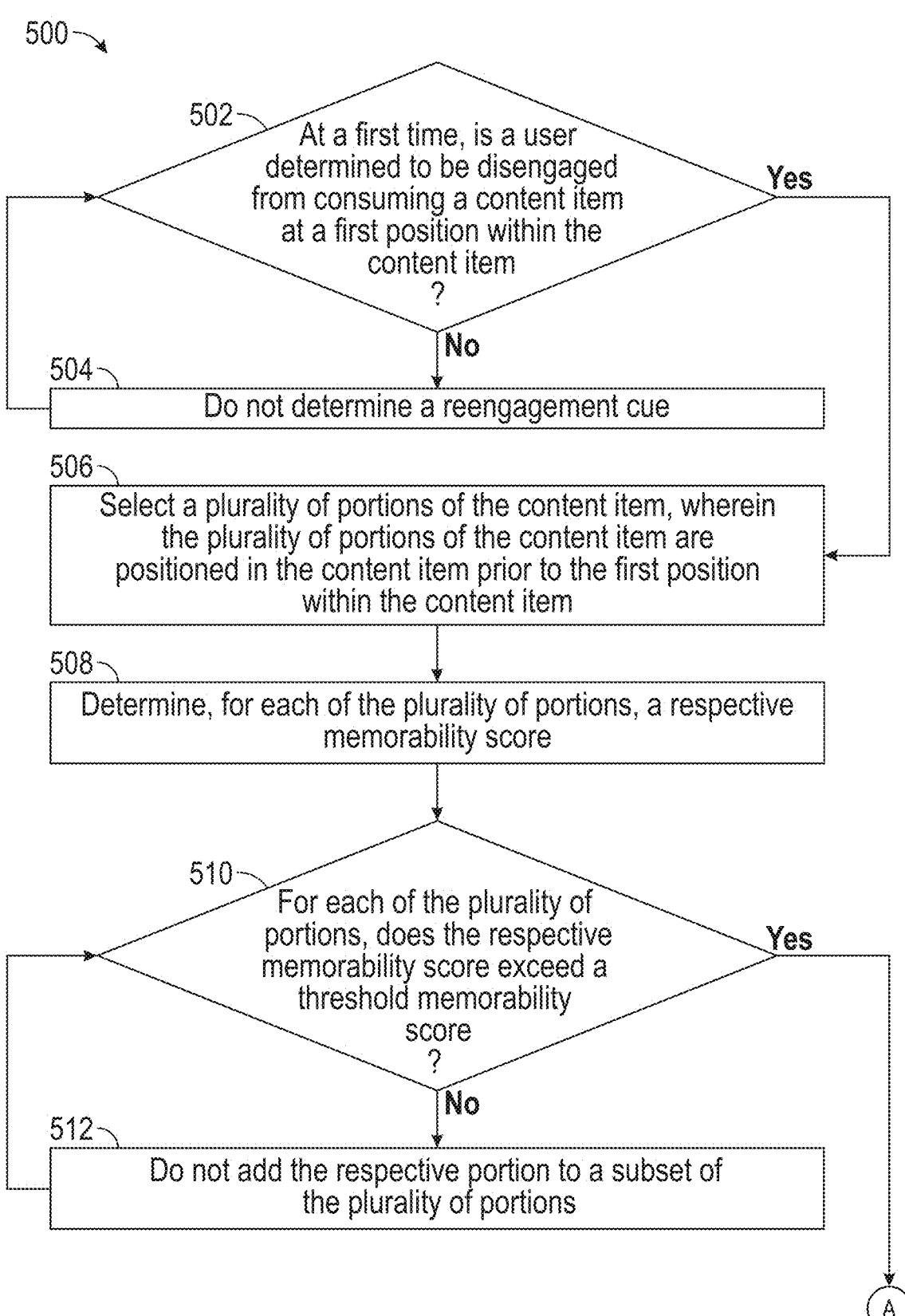

FIG. 5 is a flowchart of a detailed illustrative process for optimizing reengagement with a content item by leveraging advanced memory-related techniques, in accordance with some embodiments of this disclosure. In various embodiments, the individual steps of process 500 may be implemented by one or more components of the devices, methods, and systems of FIG. 1 and FIGS. 3-4, and may be performed in combination with any of the other processes and aspects described herein. Although the present disclosure may describe certain steps of process 500 (and of other processes described herein) as being implemented by certain components of the devices, methods, and systems of FIG. 1 and FIGS. 3-4, this is for purposes of illustration only, and it should be understood that other components of the devices, methods, and systems of FIG. 2 and FIGS. 6-8 may implement those steps instead.

In some embodiments, at 502, control circuitry (e.g., control circuitry 304 of FIG. 3 and/or control circuitry 411 of FIG. 4) determines, at a first time, whether a user is disengaged from consuming a content item (e.g., content item 106 of FIG. 1) at a first position (e.g., first position 108 of FIG. 1) within the content item. For example, control circuitry determines that a threshold amount of time has passed without receiving a user input, as described in connection with FIG. 1. If control circuitry determines, at 502, at the first time, that the user is not disengaged from consuming the content item, control circuitry may proceed to 504. For example, control circuitry received a user input within a time shorter than the threshold amount of time. At 504, in some implementations, control circuitry does not determine a reengagement cue. In some embodiments, control circuitry returns to 502 after 504.

If control circuitry determines, at 502, at the first time, that the user is disengaged from consuming the content item, control circuitry may proceed to 506. In some embodiments, at 506, control circuitry selects a plurality of portions of the content item, wherein the plurality of portions of the content item are positioned in the content item prior to the first position within the content item. For example, control circuitry selects portions of the content item that occur before 23 minutes and 35 seconds into the content item. In some implementations, at 508, control circuitry determines, for each of the plurality of portions, a respective memorability score. For example, control circuitry may input each of the plurality of portions into a trained neural network (e.g., neural network 110 of FIG. 1) and receive (as an output of neural network 110) a plurality of respective memorability scores. Each respective memorability score may be based at least in part on the emotional intensity of the respective portion, importance of the respective portion to the overall plot of the content item, past memorability score data, any other suitable memorability factor, or any suitable combination thereof.

In some embodiments, at 510, control circuitry determines whether, for each of the plurality of portions, the respective memorability score exceeds a threshold memorability score. If control circuitry determines, at 510, that the respective memorability score does not exceed a threshold memorability score, control circuitry may proceed to 512. At 512, in some implementations, control circuitry does not add the respective portion to a subset of the plurality of portions. For example, the portion is a transitional segment that has a low memorability score. In some embodiments, control circuitry returns to 510 after 512. If control circuitry determines, at 510 that the respective memorability score exceeds a threshold memorability score, control circuitry may proceed to 514. In some embodiments, at 514, control circuitry adds the respective portion to a subset of the plurality of portions. For example, the portion has a high emotional intensity and high memorability score. In some implementations, at 516, control circuitry identifies the subset of the plurality of portions based on the respective memorability scores, wherein the subset comprises at least two portions. For example, the subset may comprise two visual portions and one audio portion.

In some embodiments, at 518, control circuitry generates a reengagement cue (e.g., reengagement cue 114 of FIG. 1) based on at least part of each of the portions in the subset.

For example, the reengagement cue may comprise several key actors from the portions in the subset of the content item in a synthesized image and an audio component. Control circuitry may utilize an AI model such as a GAN to synthesize at least part of each of the portions in the subset into the reengagement cue. In some implementations, at 520, control circuitry determines whether, at a second time later than the first time, a request to reengage with the content item is received. Control circuitry may receive a request via a voice command, a user interface input on the user device displaying the content item, a user interface input on a secondary user device coupled to the user device displaying the content item, any other suitable user request method, or any suitable combination thereof.

If control circuitry, at 520, determines that a request to reengage with the content item is not received, control circuitry may proceed to 522. At 522, in some embodiments, control circuitry does not present the reengagement cue. In some embodiments, control circuitry returns to 520 after 522. If control circuitry, at 520, determines that a request to reengage with the content item is received, control circuitry may proceed to 524. At 524, in some implementations, control circuitry, based at least in part on the receiving the request at the second time, presents the reengagement cue. In some embodiments, control circuitry displays the reengagement cue on a user interface of the user device running the media application comprising an electronic programming guide (EPG). In some embodiments, control circuitry presents the reengagement cue as a content item identifier for the content item, e.g., in place of a traditional thumbnail.

Figure 6:
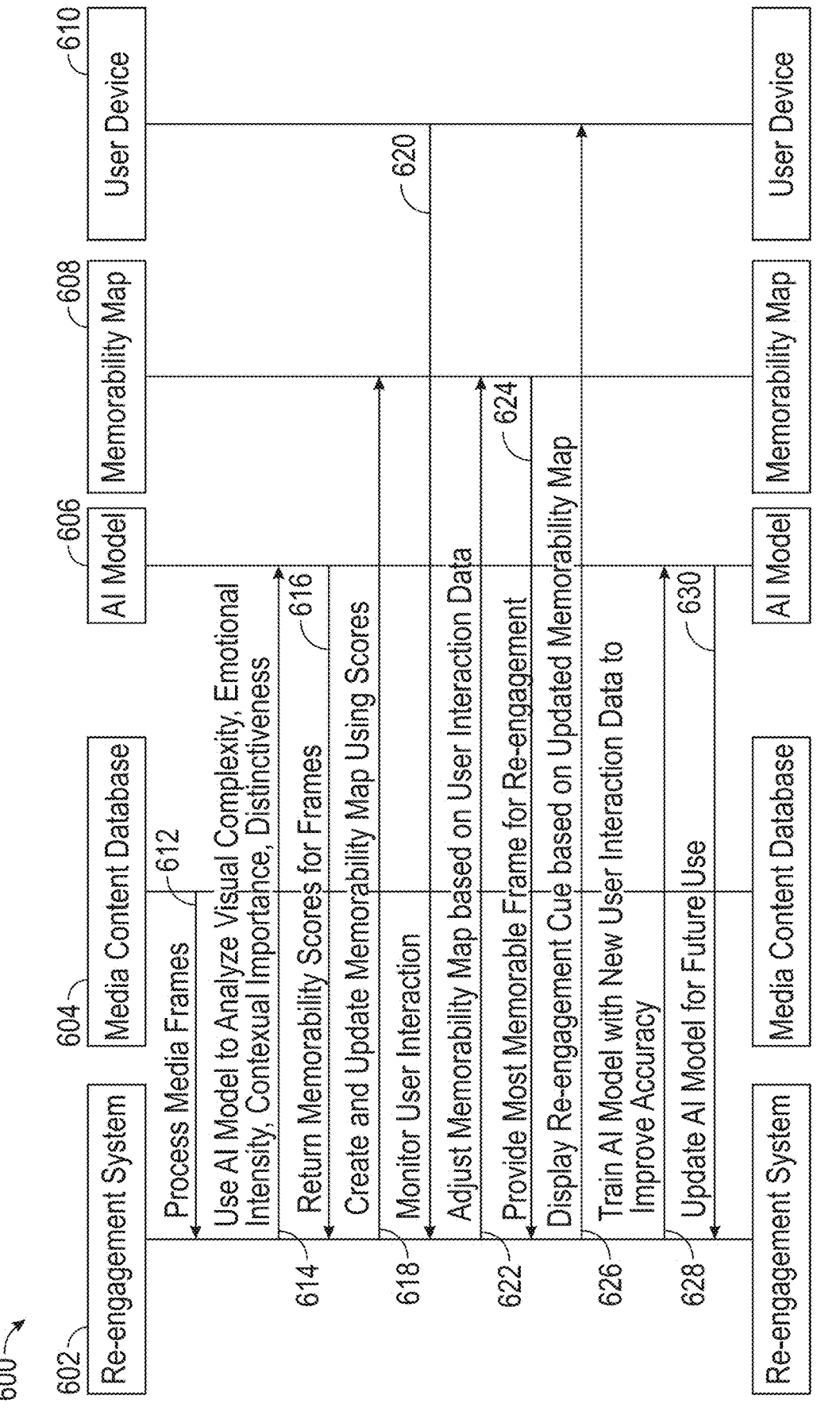
FIG. 6 is a sequence diagram of a detailed illustrative process for generating a reengagement cue using memorability mapping, in accordance with some embodiments of this disclosure.

FIG. 6 is a sequence diagram of a detailed illustrative process for generating a reengagement cue using memorability mapping, in accordance with some embodiments of this disclosure. In various embodiments, the individual steps of process 600 may be implemented by one or more components of the devices, methods, and systems of FIG. 1 and FIGS. 3-4, and may be performed in combination with any of the other processes and aspects described herein. Although the present disclosure may describe certain steps of process 600 (and of other processes described herein) as being implemented by certain components of the devices, methods, and systems of FIG. 1 and FIGS. 3-4, this is for purposes of illustration only, and it should be understood that other components of the devices, methods, and systems of FIG. 2, FIG. 5, and FIGS. 7-8 may implement those steps instead.

Reengagement system 602 may be the same reengagement system as described in connection with FIGS. 1-5. In some embodiments, at 612, reengagement system 602 processes media frames received from media content database 604. For example, the reengagement system may determine the format, size, and/or resolution of the media frames to ensure compatibility with AI model 606. In some implementations, reengagement system 602 performs transcoding for the media frames. In some embodiments, reengagement system 602 transmits the media frames to a separate transcoder. Media content database 604 may be part of the media application running on the user device or may be stored on a remote server, the user device running the media application, any other suitable storage, or any suitable combination thereof. In some implementations, at 614, reengagement system 602 uses AI model 606 to analyze visual complexity, emotional intensity, contextual importance, and distinctiveness of the media frames. AI model 606 may be trained to evaluate plot structure and pacing of content items. AI model 606 may use techniques described in FIG. 1 to analyze the media frames of the content item.

In some embodiments, at 616, AI model 606 returns memorability scores for each of the media frames to reengagement system 602. For example, one media frame (e.g., portion) of the content item may be assigned a memorability score of 0.8 (high memorability) while another media frame is assigned a memorability score of 0.3 (low memorability). In some implementations, at 618, reengagement system 602 creates and updates memorability map 608 using the memorability scores. Memorability map 608 may be at least one neural network (e.g., neural network 110 of FIG. 1) trained with memorability datasets to evaluate the content item and generate memorability scores for each portion of the content item. Memorability map 608 may be stored on a remote server, the user device running the media application, any other suitable storage, or any suitable combination thereof. In some embodiments, at 620, reengagement system 602 monitors user interactions received from user device 610. The user interactions may be detected by available sensor data of the user device and/or available sensor data of any other suitable user device, a rewind operation, a pause operation, any other suitable trick-play operation, any suitable user input, or any suitable combination thereof.

In some implementations, at 622, reengagement system 602 adjusts memorability map 608 based on user interaction data. For example, memorability map 608 is updated to be more personalized to the user based on the user interaction data. In some embodiments, at 624, memorability map 608 provides reengagement system 602 the most memorable frame for reengagement. For example, the most memorable frame is the frame with the highest memorability score. In another example, the most memorable frame does not necessarily have the highest memorability score but is determined to be the most memorable for the given user. In some implementations, at 626, reengagement system 602 displays a reengagement cue based on updated memorability map 608 to a user interface of user device 610. For example, reengagement system 602 displays reengagement cue 114 of FIG. 1 at a display screen of user device 610 (e.g., a television). In some embodiments, at 628, reengagement system 602 trains AI model 606 with new user interaction data received from user device 610 to improve accuracy of the reengagement cues. In some implementations, at 630, reengagement system 602 updates AI model 606 for future use.

Figure 7:
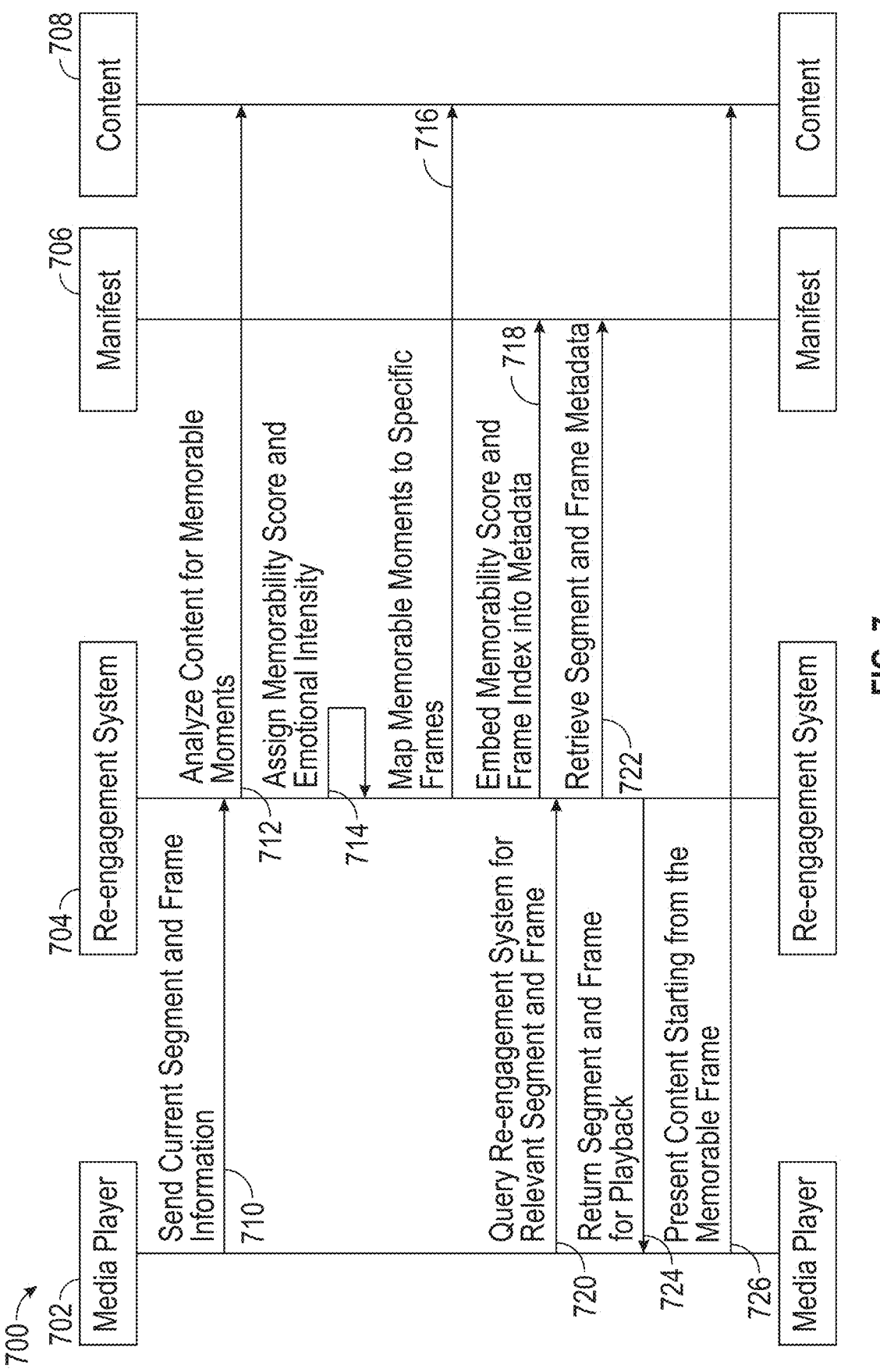
FIG. 7 is a sequence diagram of a detailed illustrative process for enhancing user reengagement with content by tagging key moments and embedding metadata into a manifest of the content, in accordance with some embodiments of this disclosure.

FIG. 7 is a sequence diagram of a detailed illustrative process for enhancing user reengagement with content by tagging key moments and embedding metadata into a manifest of the content, in accordance with some embodiments of this disclosure. In various embodiments, the individual steps of process 700 may be implemented by one or more components of the devices, methods, and systems of FIG. 1 and FIGS. 3-4, and may be performed in combination with any of the other processes and aspects described herein. Although the present disclosure may describe certain steps of process 700 (and of other processes described herein) as being implemented by certain components of the devices, methods, and systems of FIG. 1 and FIGS. 3-4, this is for purposes of illustration only, and it should be understood that other components of the devices, methods, and systems of FIG. 2, FIGS. 5-6, and FIG. 8 may implement those steps instead.

Reengagement system 704 may be the same reengagement system as described in connection with FIGS. 1-6. In some embodiments, at 710, media player 702 sends current segment and frame information to reengagement system 704. In some implementations, at 712, reengagement system 704 analyzes content 708 for memorable moments. Reengagement system 704 may use any of the techniques described in connection with FIGS. 1-2 and FIGS. 5-6. In some embodiments, at 714, reengagement system 704 assigns a memorability score and emotional intensity to each frame of content 708. For example, one frame is assigned a memorability score of 0.8 while another frame is assigned a memorability score of 0.3. In some implementations, at 716, reengagement system 704 maps memorable moments to specific frames of content 708. Each memorable moment may have a memorability score that surpasses a threshold memorability score. Each memorable moment may be mapped to a specific frame within its corresponding segment.

In some embodiments, at 718, reengagement system 704 embeds the memorability scores and frame index into metadata of content 708 in manifest 706. Manifest 706 may be an HLS manifest, an MPEG-DASH manifest, any other suitable manifest type, or any suitable combination thereof. For example, a frame with a climactic moment in content 708 may be tagged with a memorability score of 0.90, an emotional intensity rating of 0.85, and a frame index pointing to the exact frame where the critical action occurs. Manifest 706 is thus enhanced with metadata for each relevant segment, but the underlying media segments remain unchanged. When a user pauses or disengages from content 708, reengagement system 704 may record the current segment and frame. The following is an example HLS manifest reflecting the additional metadata:

```
#EXTM3U
#EXT-X-VERSION: 3
#EXT-X-TARGETDURATION: 10
#EXT-X-MEDIA-SEQUENCE: 1
#EXTINF: 10.0,
segment1.ts
#EXTINF: 10.0,
#EXT-X-METADATA:          MEMORABILITY-
   SCORE=0.75,EMOTIONAL-INTENSITY=0.60,
   FRAME-INDEX=0000452
segment2.ts
#EXTINF: 10.0,
segment3.ts
#EXTINF: 10.0,
#EXT-X-METADATA:          MEMORABILITY-
   SCORE=0.90,EMOTIONAL-INTENSITY=0.85,
   FRAME-INDEX=0000723
segment4.ts
#EXTINF: 10.0,
segment5.ts
#EXTINF: 10.0,
segment6.ts
#EXTINF: 10.0,
#EXT-X-METADATA:          MEMORABILITY-
   SCORE=0.95,EMOTIONAL-INTENSITY=0.90,
   FRAME-INDEX=0000123
segment7.ts
#EXT-X-ENDLIST
```

In some implementations, at 720, media player 702 queries reengagement system 704 for relevant segments and frames. Media player 702 may query reengagement system 704 upon receiving an indication that a user is reengaging with content 708. Media player 702 may query manifest 706 to locate the appropriate segment and use the embedded metadata to pinpoint the exact frame for playback. Such aspects may enable the user to be immediately presented with the most significant and memorable content, allowing for reengagement with the storyline. In some embodiments, at 722, reengagement system 704 retrieves segment and frame metadata from manifest 706. In some implementations, at 724, reengagement system 704 returns the segments and frames to media player 702 for playback. In some embodiments, at 726, media player 702 presents content 708 starting from the memorable frame. In some embodiments, reengagement system 704 uses portions of relevant segments and frames to generate a reengagement cue as described in FIG. 1.

Figure 8:
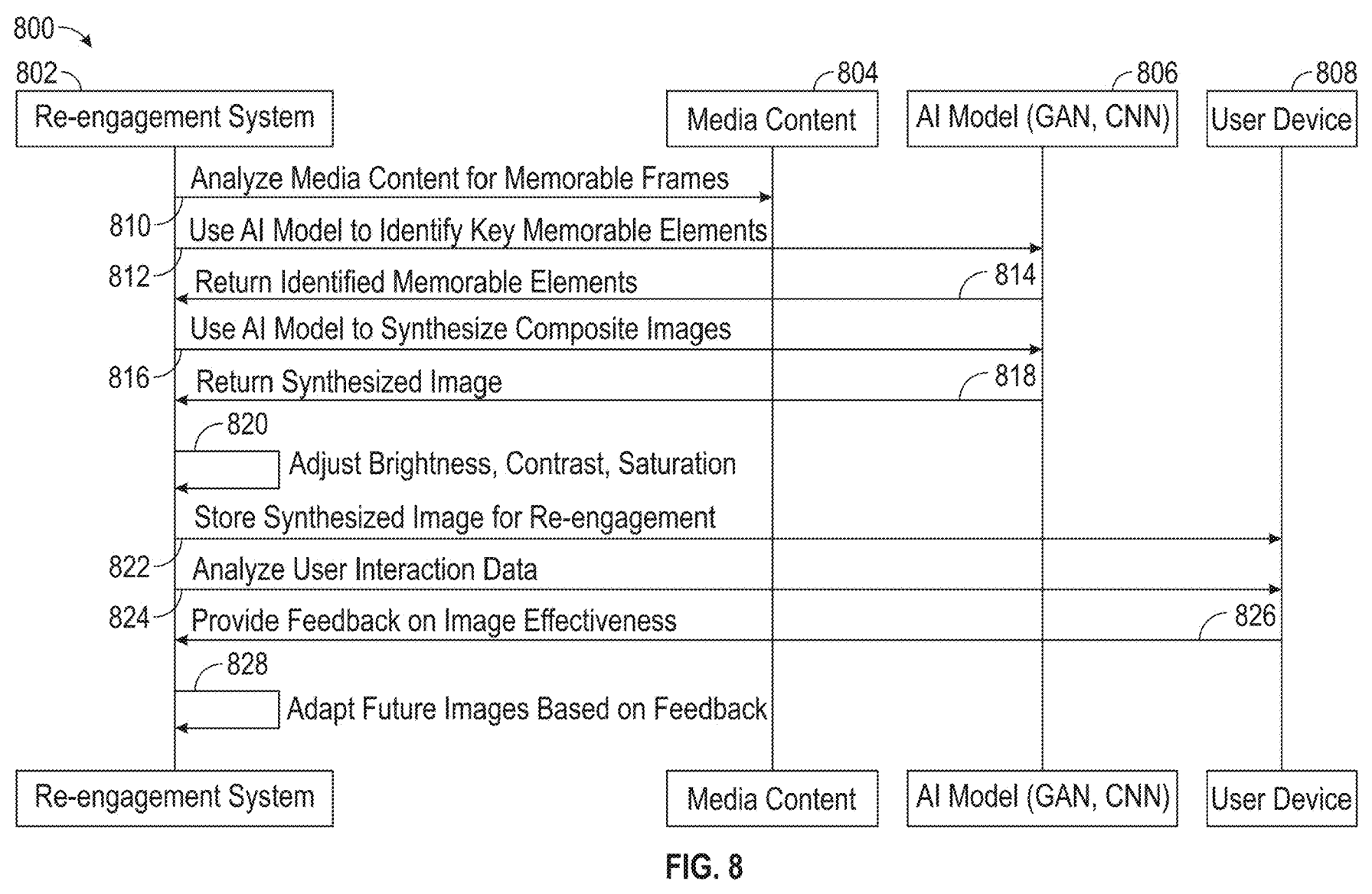

FIG. 8 is a sequence diagram of a detailed illustrative process generating a reengagement cue using generative AI, in accordance with some embodiments of this disclosure. In various embodiments, the individual steps of process 800 may be implemented by one or more components of the devices, methods, and systems of FIG. 1 and FIGS. 3-4, and may be performed in combination with any of the other processes and aspects described herein. Although the present disclosure may describe certain steps of process 800 (and of other processes described herein) as being implemented by certain components of the devices, methods, and systems of FIG. 1 and FIGS. 3-4, this is for purposes of illustration only, and it should be understood that other components of the devices, methods, and systems of FIG. 2 and FIGS. 5-7 may implement those steps instead.

Reengagement system 802 may be the same reengagement system as described in connection with FIGS. 1-7. In some embodiments, at 810, reengagement system 802 analyzes media content 804 for memorable frames. Reengagement system 802 may identify the most memorable frames and visual components from the media through deep analysis using techniques described in connection with FIGS. 1-2 and FIGS. 5-7. In some implementations, at 812, reengagement system 802 uses AI model 806 to identify key memorable elements of media content 804. The key memorable elements may be elements of the portions of media content 804 that have the highest memorability scores. In some embodiments, at 814, AI model 806 returns the identified memorable elements to reengagement system 802. In some implementations, at 816, reengagement system 802 uses AI model 806 to synthesize composite images.

In some embodiments, instead of merely displaying the original memorable frames, reengagement system 802 employs advanced deep learning techniques, such as generative adversarial networks (GANs) (e.g., AI model 806), to generate new composite images that combine the most impactful visual elements from multiple frames. Reengagement system 802's memorability mapping identifies key regions within a scene using convolutional neural networks (CNNs) trained on memorability datasets. Once the most memorable aspects of different frames are identified—such as a distinctive facial expression, a notable background, or a striking object—GANs may synthesize a new image by blending these memorable elements into a cohesive, optimized visual. For instance, a highly memorable expression from one scene may be merged with an iconic background from another, creating a composite image that is more effective in triggering the user's memory than any single frame. In some embodiments, at 818, AI model 806 returns the synthesized image to reengagement system 802.

In some implementations, at 820, reengagement system 802 adjusts the brightness, contrast, and saturation of the synthesized image through image-processing techniques. In another example, reengagement system 802 transmits the synthesized image to an image enhancement system to adjust the brightness, contrast, and saturation. These adjustments may be made to emphasize elements most likely to aid recall, tailoring the appearance of the synthesized image to maximize its effectiveness as a reengagement cue. The synthesized image may be used as a reengagement cue or as part of a reengagement cue (e.g., reengagement cue 114 of FIG. 1). In some embodiments, at 822, reengagement system 802 stores the synthesized image for reengagement at user device 808. In another example, the synthesized image is stored at a remote server.

In some implementations, at 824, reengagement system 802 analyzes user interaction data from user device 808. Reengagement system 802 may continually analyze user interaction data. The user interactions may be detected by available sensor data of the user device and/or available sensor data of any other suitable user device, a rewind operation, a pause operation, any other suitable trick-play operation, any suitable user input, or any suitable combination thereof. In some embodiments, at 826, user device 808 provides feedback on image effectiveness to reengagement system 802. For example, as described in connection with FIG. 1, reengagement system 802 may receive an indication of a user recalling or not recalling elements of a displayed reengagement cue. In another example, reengagement system 802 may receive a selection of at least one reengagement cue of a plurality of reengagement cues. In some implementations, at 828, reengagement system 802 adapts future images based on the feedback by prioritizing similar types of elements in future reengagement cues.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

at a first time, determining that a user has disengaged from consuming a content item at a first position within the content item;

determining a reengagement cue for the content item, wherein determining the reengagement cue comprises:

selecting a plurality of portions of the content item, wherein the plurality of portions of the content item are positioned in the content item prior to the first position within the content item;

determining, for each of the plurality of portions, a respective memorability score;

identifying a subset of the plurality of portions based on the respective memorability scores, wherein the subset comprises at least two portions; and generating the reengagement cue based on at least part of each of the portions in the subset; and based at least in part on receiving, at a second time later than the first time, a request to reengage with the content item, presenting the reengagement cue.

2. The method of claim 1, wherein the subset of the plurality of portions comprises at least one visual portion or at least one audio portion.

3. The method of claim 1, wherein the determining that the user has disengaged from consuming the content item at the first position within the content item comprises:

during presentation of the content item, determining that a threshold amount of time has elapsed without receiving a user input, wherein the user is determined to be disengaged based at least in part on the threshold amount of time being elapsed.

4. The method of claim 1, wherein the plurality of portions of the content item are selected based at least in part on one or more of a bubble search, a binary search, a Fibonacci search, an interpolation search, or an exponential search.

5. The method of claim 1, further comprising:

training a neural network with a plurality of memorability datasets;

wherein the determining, for each of the plurality of portions, the respective memorability score comprises:

inputting each of the plurality of portions into the trained neural network; and outputting, from the trained neural network, the respective memorability score for each of the plurality of portions.

6. The method of claim 1, wherein the reengagement cue comprises at least one image.

7. The method of claim 1, wherein the reengagement cue comprises at least one video segment.

8. The method of claim 1, wherein the subset of the plurality of portions is a first subset, and wherein the identifying the subset of the plurality of portions further comprises:

generating for display a plurality of reengagement cues based on the at least part of each of the portions in the first subset;

receiving a selection of a first reengagement cue of the plurality of reengagement cues;

based on the selection of the first reengagement cue, updating a user selection criterion; and identifying a second subset of the plurality of portions based at least in part on the updated user selection criterion.

9. The method of claim 1, wherein the respective memorability score of each portion of the subset of the plurality of portions exceeds a threshold memorability score, and wherein the generating the reengagement cue further comprises:

synthesizing the at least part of each of the portions in the subset using a generative adversarial network (GAN).

10. The method of claim 1, further comprising:

identifying a user device used to present the content item;

determining a modified reengagement cue based on the user device; and presenting the modified reengagement cue.

11. The method of claim 1, further comprising:

embedding the respective memorability score for each portion of the plurality of portions into at least one manifest of the content item.

12. The method of claim 1, wherein the reengagement cue is a thumbnail, and wherein the thumbnail is a synthesized image based on at least part of each of the portions in the subset.

13. The method of claim 1, further comprising:

generating for display a plurality of reengagement cues in a plurality of positions along a timeline of the content item, wherein the plurality of positions correspond to a plurality of timepoints of the content item;

determining a selected reengagement cue of the plurality of reengagement cues based on a user interface input; and presenting the content item beginning at a first timepoint corresponding to the selected reengagement cue.

14. A system comprising:

control circuitry configured to:

at a first time, determine that a user has disengaged from consuming a content item at a first position within the content item;

determine a reengagement cue for the content item, wherein determining the reengagement cue comprises:

selecting a plurality of portions of the content item, wherein the plurality of portions of the content item are positioned in the content item prior to the first position within the content item;

determining, for each of the plurality of portions, a respective memorability score;

identifying a subset of the plurality of portions based on the respective memorability scores, wherein the subset comprises at least two portions; and generating the reengagement cue based on at least part of each of the portions in the subset; and input/output circuitry configured to:

based at least in part on receiving, at a second time later than the first time, a request to reengage with the content item, present the reengagement cue.

15. The system of claim 14, wherein the subset of the plurality of portions comprises at least one visual portion or at least one audio portion.

16. The system of claim 14, wherein the control circuitry is configured to determine that the user has disengaged from consuming the content item at the first position within the content item by:

during presentation of the content item, determining that a threshold amount of time has elapsed without receiving a user input, wherein the user is determined to be disengaged based at least in part on the threshold amount of time being elapsed.

17. The system of claim 14, wherein the plurality of portions of the content item are selected based at least in part on one or more of a bubble search, a binary search, a Fibonacci search, an interpolation search, or an exponential search.

18. The system of claim 14, wherein the control circuitry is further configured to:

train a neural network with a plurality of memorability datasets;

wherein the determining, for each of the plurality of portions, the respective memorability score comprises:

inputting each of the plurality of portions into the trained neural network; and outputting, from the trained neural network, the respective memorability score for each of the plurality of portions.

19. The system of claim 14, wherein the reengagement cue comprises at least one image.

20. The system of claim 14, wherein the reengagement cue comprises at least one video segment.

* * * * *